(12) United States Patent
Shukla et al.

(10) Patent No.: US 6,506,819 B1
(45) Date of Patent: Jan. 14, 2003

(54) LIGHT WEIGHT PARTICULATE COMPOSITE MATERIALS WITH CENOSPHERES AS REINFORCEMENTS AND METHOD FOR MAKING THE SAME

(75) Inventors: Arun Shukla, Wakefield, RI (US); Venkitanarayanan Parameswaran, Wakefield, RI (US)

(73) Assignee: The Board of Governors for Higher Education State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 09/710,816

(22) Filed: Nov. 9, 2000

Related U.S. Application Data

(60) Provisional application No. 60/164,595, filed on Nov. 10, 1999.

(51) Int. Cl.$^7$ ............... C08J 9/32; C08L 67/00
(52) U.S. Cl. ............ 523/218; 523/513; 523/514; 523/521
(58) Field of Search ................... 523/218, 513, 523/514, 521

(56) References Cited

U.S. PATENT DOCUMENTS

| | | | | |
|---|---|---|---|---|
| 3,873,475 A | * | 3/1975 | Pechacek et al. |
| 5,194,334 A | * | 3/1993 | Uerdingen et al. |
| 5,967,211 A | * | 10/1999 | Lucas et al. |
| 6,034,155 A | * | 3/2000 | Espeland et al. |
| 6,048,593 A | * | 4/2000 | Espeland et al. |
| 6,207,077 B1 | * | 3/2001 | Burnell-Jones |

* cited by examiner

Primary Examiner—Tae H. Yoon
(74) Attorney, Agent, or Firm—Samuels, Gauthier & Stevens, LLP

(57) ABSTRACT

This invention provides a particulate composite comprising a polyester resin, a plasticizer, and a plurality of cenospheres. The polyester resin and the plasticizer form a matrix wherein the cenospsheres are distributed nonhomogeneously in the matrix. The nonhomogenous distribution of cenospheres further comprises a continuously varying particle volume fraction along a single dimension.

5 Claims, 17 Drawing Sheets

Optical micrograph of cenospheres (a) Cenosphere volume fraction 0.05

(b) Cenosphere volume fraction 0.11

Micrograph of damage developed under dynamic loading (a) cellular pattern of cracks (b) crushed matrix and cenospheres.

LIGHT WEIGHT PARTICULATE COMPOSITE MATERIALS WITH CENOSPHERES AS REINFORCEMENTS AND METHOD FOR MAKING THE SAME

This application claims the benefit of a Provisional Application No. 60/164,595 filed on Nov. 10. 1999.

Statement Regarding Federally Sponsored Research or Development

The U.S. Government has a paid-up license in this invention and the right in limited circumstances to require the patent owner to license others on reasonable terms as provided for by the terms of grants CMS 9424114 and INT 9700670 from the National Science Foundation.

BACKGROUND OF THE INVENTION

1. Field of the Invention

This invention relates generally to Functionally Gradient Materials (FGMs) and methods for making the same.

2. Description of the Related Art

Functionally Gradient Materials (FGMs) are composites in which the material composition is varied spatially to optimize the performance of the material for a specific application. Since the properties of FGMs also vary spatially, they fall under the category of nonhomogeneous solids. With the introduction of their concept, research into the various aspects of FGMs such as processing, material behavior under different types of loading, fracture mechanics etc., have gained considerable attention and are still being pursued. Most of the investigations which focus on material behavior of FGMs are limited to analytical or numerical studies and very few experimental studies have been reported. One of the major drawbacks associated with experimental studies is the preparation of FGMs having large scale gradation. Preparation of ceramic-metal FGMs, which are used in high temperature applications, is expensive and requires elaborate processing facilities. Therefore, the use of model FGMs to understand the physical phenomena associated with such nonhomogeneous solids is an expedient alternative.

Property gradation in FGMs can be either continuous or in layers. A simple procedure for preparing FGMs graded in layers using polyester resin and plasticizer has been described. V. Parameswaran and A. Shukla, "Dynamic Fracture of a Functionally Gradient Material Having Discrete Property Variation", Material Science and Engineering, 33, (1998) 3303–3311. Recently, Marur and Tippur have proposed a gravity assisted casting technique to prepare continuously graded FGMs using epoxy resin and glass beads has been proposed. P. R. Marur and H. V. Tippur, "Evaluation of Mechanical Properties of Functionally Gradient Materials", To appear in Journal of Testing and Evaluation. (1998). The present invention discloses a continuously graded FGM comprised of polyester, plasticizer and cenospheres and a simple and inexpensive technique to make the same.

BRIEF SUMMARY OF THE INVENTION

Broadly, the invention comprises a continuously graded FGM comprised of polyester, plasticizer and cenospheres. Polyester resin and plasticizer are mixed to form a liquid matrix. Censopheres are added to the matrix. The cenosphere-matrix mixture is then poured into a mold. As the matrix solidifies, the cenospheres, having a lower specific density than the matrix, migrate towards the top of the mold. When the mixture is solid a particulate composite results that has a continuously varying particle volume fraction along a single dimension.

The nonhomogeneous distribution of cenospheres in a polyester matrix is achieved by employing a buoyancy assisted casting process. The overall material properties of the FGM are tailored by adding plasticizer to the polyester matrix. The density, quasi-static and dynamic modulus, quasi-static fracture toughness and dynamic response of the FGMs are obtained as a function of the cenosphere volume fraction. A fractographic analysis of the fractured specimens is also performed to identify the various fracture mechanisms and the results are discussed. The invention further comprises the applicability of some empirical models for estimating the overall properties of the FGM.

The FGM of this invention is lightweight, requires simple processing and is inexpensive. Further, the FGM requires the use of cenospheres which reduces the environmental problems associated with cenosphere disposal. The FGM of this invention can be used in products currently made of polymer resins such as insulation, cabinets, boat hulls and floatation devices.

The FGM of this invention was prepared by mixing a polyester plasticizer with a polyester resin to form a matrix. Cenospheres were added to the matrix and then the matrix-cenospheres mixture was poured into a mold. When the cenospheres-matrix was poured, the top layer of the mixture which is rich in cenospheres is poured first and fills the bottom layer of the mold. Thereafter, the cenospheres diffuse towards the surface of the mold due to buoyancy. When the mixture solidifies, the result is a particulate composite comprised of a nonhomogeneous mixture of censospheres. In the preferred embodiment of the invention, the top layer has the greatest number of cenospheres, the middle layer has an intermediate number of cenospheres and the bottom layer has the least amount of cenospheres thereby resulting in a particulate composite with continuously varying particle volume fraction along a single dimension.

In another embodiment of the invention, a simple procedure for preparing FGMs with continuous gradation of properties was developed using polyester, plasticizer and cenospheres. The FGMs of the invention are characterized by a cenosphere content of the FGMs that increases from >0 over a distance of 250 mm in a continuous manner, a density that decreases by 20% with increasing cenosphere volume fraction, a quasi static and dynamic modulus that increases linearly with increasing cenosphere volume fraction whereas the compressive strength of the material decreases with increasing cenosphere content and a fracture toughness that increases with increasing cenosphere content whereby a change in fracture mechanism from interface failure to cenosphere breaking was observed at higher cenosphere volume fraction. Further, the estimates of quasi static modulus using the Halpin-Tsai relation with porosity correction matches very well with the measured values and the addition of the plasticizer to the polyester matrix increased the over all fracture toughness and decreased the elastic modulus and compressive strength of the FGMs. The FGMs of the invention are also characterized in that the dynamic peak stress registered by the FGMs decreased with extensive damage to the specimen as the cenosphere content increases.

Because large specimens were prepared, the spatial variation of properties per unit length in this material were small, e.g. the elastic moduli variation was 9 GPa/m.

BRIEF DESCRIPTION OF THE PREFERRED EMBODIMENT

FGM Preparation

Figure 1:
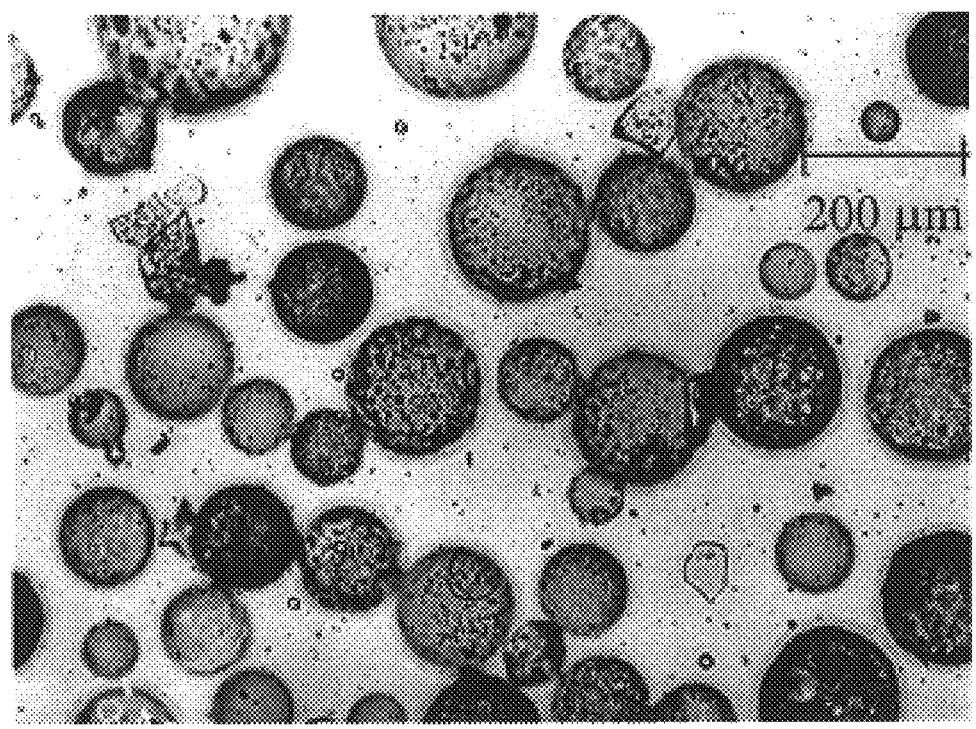
FIG. 1 is an optical micrograph of cenospheres.

The FGM was prepared as a particulate composite with continuously varying article volume fraction along a single dimension. Cenospheres (LV01-SG) supplied by Sphere Services Inc., TN, USA, were used as the particles. These cenospheres, obtained from the fly ash of thermal power plants, are hollow spheres made of aluminum silicates. FIG. 1 shows a micrograph of the cenospheres. The physical and chemical properties of the cenospheres are provided in Table 1.

Polyester resin (MR17090) and polyester with equal amount of plasticizer (MR9600), manufactured by Ashland Chemical Company, were used as the matrix material to prepare two FGMs having different overall properties. These resins, available in liquid form, were cured by the addition of a catalyst (Methyl Ethyl Ketone Peroxide 0.85% w/w) and an accelerator (Cobalt Octoate 0.03% w/w). First, the polyester/polyester-plasticizer was mixed thoroughly with appropriate amounts of catalyst and accelerator. Cenospheres, 25% by weight of the resin, were added slowly to the resin along with mixing to ensure complete wetting of the spheres by the resin. The mixture was kept in a vacuum of 660 mm of mercury for about 20 minutes to expel the air bubbles trapped in the resin during mixing. The entire mixture was then gradually poured into a 250×250×12 mm size acrylic mold and allowed to cure in a vertical position at room temperature and pressure for 48 hours. The sides of the mold were lined with mylar sheet (0.18 mm thick) to obtain a smooth and shiny surface and to facilitate easy removal of the cast sheet. The sheets were removed from the mold and post cured in an air circulating oven for 4 hours at 52° C. followed by 5 hours at 63° C. Post curing at elevated temperature ensures complete cross linking of the polymer and thereby yields the maximum strength and stiffness properties to the sheets.

The spheres have a low specific gravity of 0.67 as compared to 1.18 for the resin. When the resin-cenosphere mixture is poured into the mold, the top layer of the mixture which is rich in cenospheres gets poured first and fills the bottom layer of the mold. Subsequently, the cenospheres diffuse toward the surface of the mold due to buoyancy. The resin takes approximately 4 to 5 hours for gelation and once it gels and starts curing, further diffusion of spheres is arrested by the increased viscosity. This resulted in a casting with a resin rich region in the bottom, a cenosphere rich region at the top, and an intermediate region with continuously varying cenosphere content. Using this method, 250×250×12 mm size FGM sheets, having a continuous gradation of cenosphere content over a length of 250 mm, were prepared.

TABLE 1

Properties of cenospheres*

| Physical properties | | Chemical composition (%) | |
| --- | --- | --- | --- |
| Specific gravity | 0.67 | Silica, $SiO_2$ | 64.4 |
| Bulk density | 375 kg/m$^3$ | Alumina, $Al_2O_3$ | 29.4 |
| Size range | 10–300 μm | Iron oxide, $Fe_2O_3$ | 4.3 |
| Mean size | 127 μm | Titania, $TiO_2$ | 1.0 |
| Wall thickness | 0.1 diameter | Organic matter | 0.9 |

*Product information sheet for LV01-SG from Sphere Services Inc.

Material Characterization

Density and Cenosphere Volume Fraction

Since the cenospheres are hollow and their specific gravity is much lower than hat of the resin, the density of the composite decreases with increasing cenosphere content. Thus, density gives an indirect measure of the cenosphere content in the composite. Samples (12 mm cubes) were sliced from the FGM at 12 mm intervals and their sides were machined to achieve consistent dimensions. The density of these samples was measured and the density profile of the FGM was generated. The spatial variation of cenosphere volume fraction was calculated from the density profile using the rule of mixtures given in equation 1.

$$V_s = \frac{\rho_m - \rho_c}{\rho_m - \rho_s} \tag{1}$$

where, $\rho_c$, and $\rho_m$ are the density of the composite and the resin respectively, $\rho_s$ is the apparent density (specific gravity) of the cenosphere and $V_S$ is the cenosphere volume fraction.

Elastic Properties

The modulus profile of the FGM was generated by measuring the elastic modulus of samples at 25 mm intervals. The quasi-static tensile stress-strain curve for the different samples were obtained following the ASTM standard testing procedure D 638 for rigid plastics. In estimating the Young's modulus the variation of cenosphere volume fraction over the 12 mm test section was neglected. The quasi-static compressive strength of the FGMs was measured at 12 mm intervals following the ASTM standard testing procedure D 695.

Fracture Toughness

Figure 2:
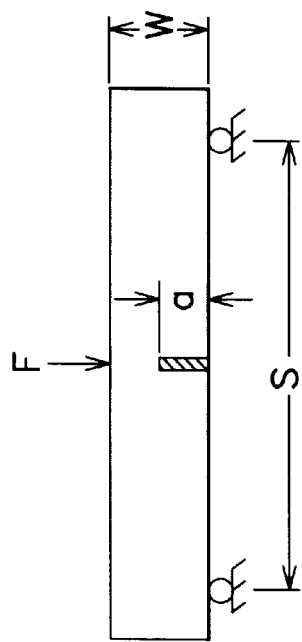
FIG. 2 is an illustration of a single edge notched specimen.

The quasi-static fracture toughness of the FGM was measured at 25 mm intervals using the single edge notched specimen under three point bending as shown in FIG. 2. The initial crack was prepared following the procedures outlined in ASTM standard 5045. Since forming a sharp natural crack of the required length was not possible due to the structure of the material, a 300 µm band saw notch was initially made and was subsequently sharpened by scribing with a razor blade. The fracture toughness was calculated from the failure load (F) using the equation 2.

$$K_1 = \frac{FS}{BW^{\frac{3}{2}}} \frac{3\sqrt{x}(1.99 - x(1-x)[2.15 - 3.93x + 2.7x^2])}{2(1+2x)(1-x)^{\frac{3}{2}}} \quad (2)$$

$$x = \frac{a}{W}$$

Dynamic Properties

The dilatational wave speed of the material was measured at different locations 25 mm apart. A compressive wave was initiated in the FGM sheet at the required location by a low velocity impact on the free edge which was parallel to the gradation. Two accelerometers, mounted 150 mm apart, were used to register the arrival times of the wave front at these locations. Using this information the compressive wave speed was calculated. The dynamic modulus of the material (E) was evaluated from the dilatational wave speed ($C_L$) using equation 3.

$$C_L = \sqrt{\frac{E}{(1-v^2)\rho}}$$

where v is the Poisson's ratio and ρ is the density (3)

Figure 3:
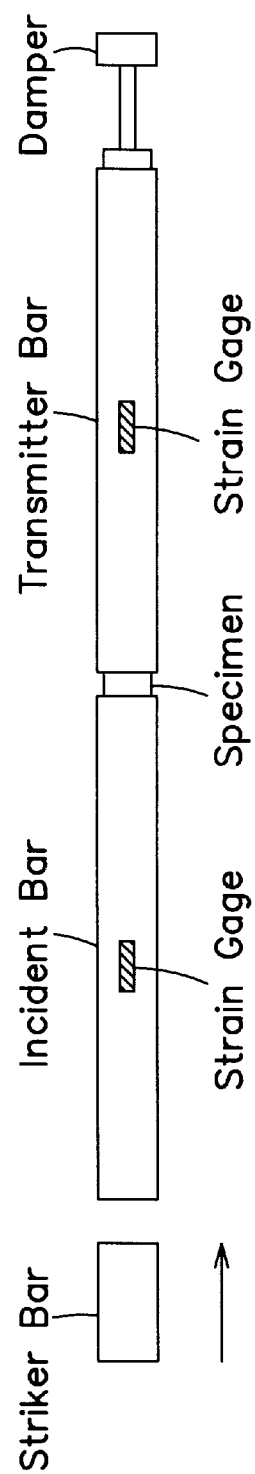
FIG. 3 is an illustration of a schematic of a SHPB setup.

The dynamic stress-strain response of the material as a function of cenosphere content was also investigated using the Split Hopkinson Pressure Bar (SHPB) technique in compression. The SHPB set up, shown in FIG. 3, consists of an incident bar and a transmitter bar, both instrumented with strain gages. The specimen is sandwiched between the two bars. The impact of the striker bar onto the incident bar generates a compressive stress pulse of finite length in the incident bar. On reaching the specimen, part of the stress pulse gets transmitted through the specimen into the transmitter bar while the remaining pulse gets reflected back into the incident bar. The time resolved strain histories in the bars are recorded through the strain gages.

The dynamic stress-strain response of the specimen can be obtained from these strain histories using the theory of one-dimensional wave propagation. Assuming homogeneous deformation of the specimen, the stress ($\sigma_s$) and strain ($\epsilon_s$) in the specimen as a function of time can be generated from the reflected ($\epsilon_r$) and transmitted ($\epsilon_t$) strain signals using the relations given in equation 4.

$$\epsilon_s(t) = \frac{-2c_b}{l_s} \int_0^t \epsilon_r(t) dt \quad (4)$$

$$c_b = \sqrt{\frac{E_b}{\rho_b}}$$

$$\sigma_s(t) = E_b \frac{A_b}{A_s} \epsilon_t(t)$$

where $A_b$ and $A_s$ are the cross-sectional areas of the bar and specimen respectively, $l_s$ is the specimen length, $c_b$ is the wave speed in the bar material and $E_b$ and $\rho_b$ are the Young's modulus and density of the bar material respectively. Cylindrical specimens having a diameter of 10 mm and a thickness of 3 mm were used to obtain the dynamic stress strain curve of the FGM at locations 15 mm apart.

Results of Material Characterization
Physical Properties

Figure 4A:
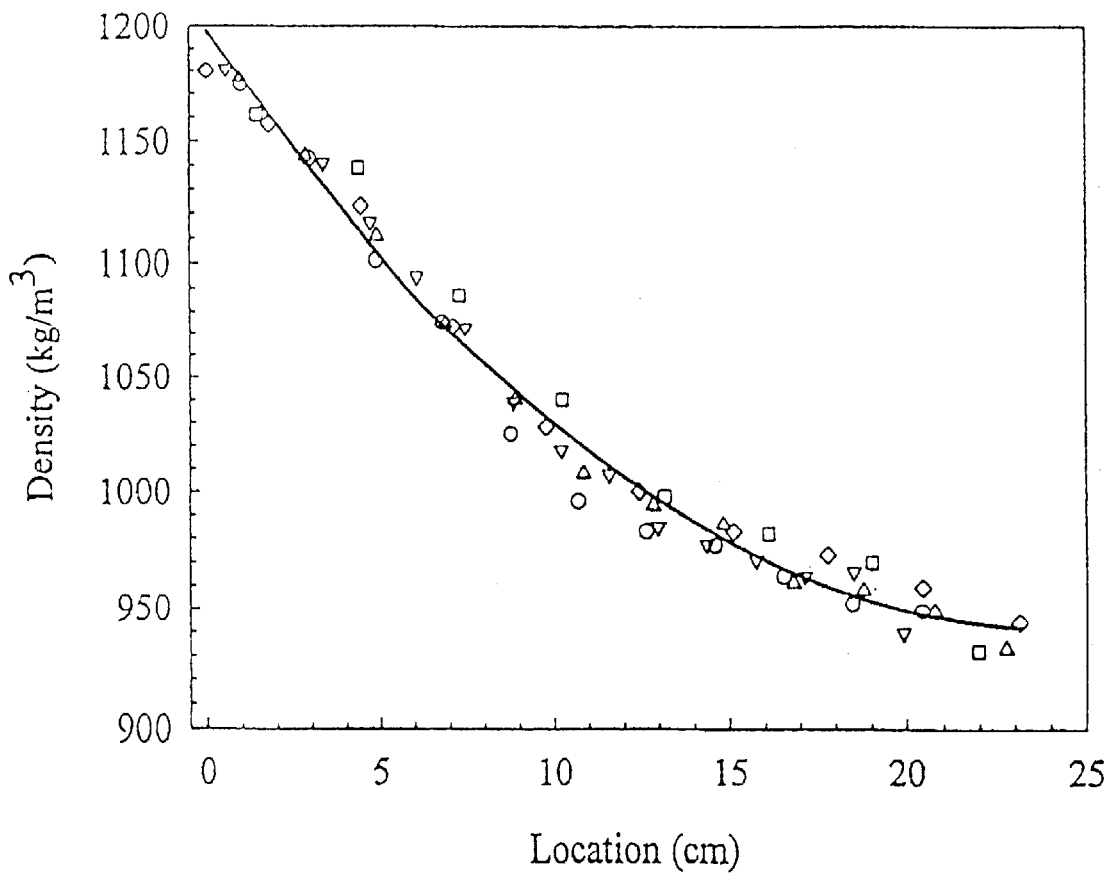
FIG. 4a is a graph of a density profile for an FGM with a polyester matrix.
Figure 4B:
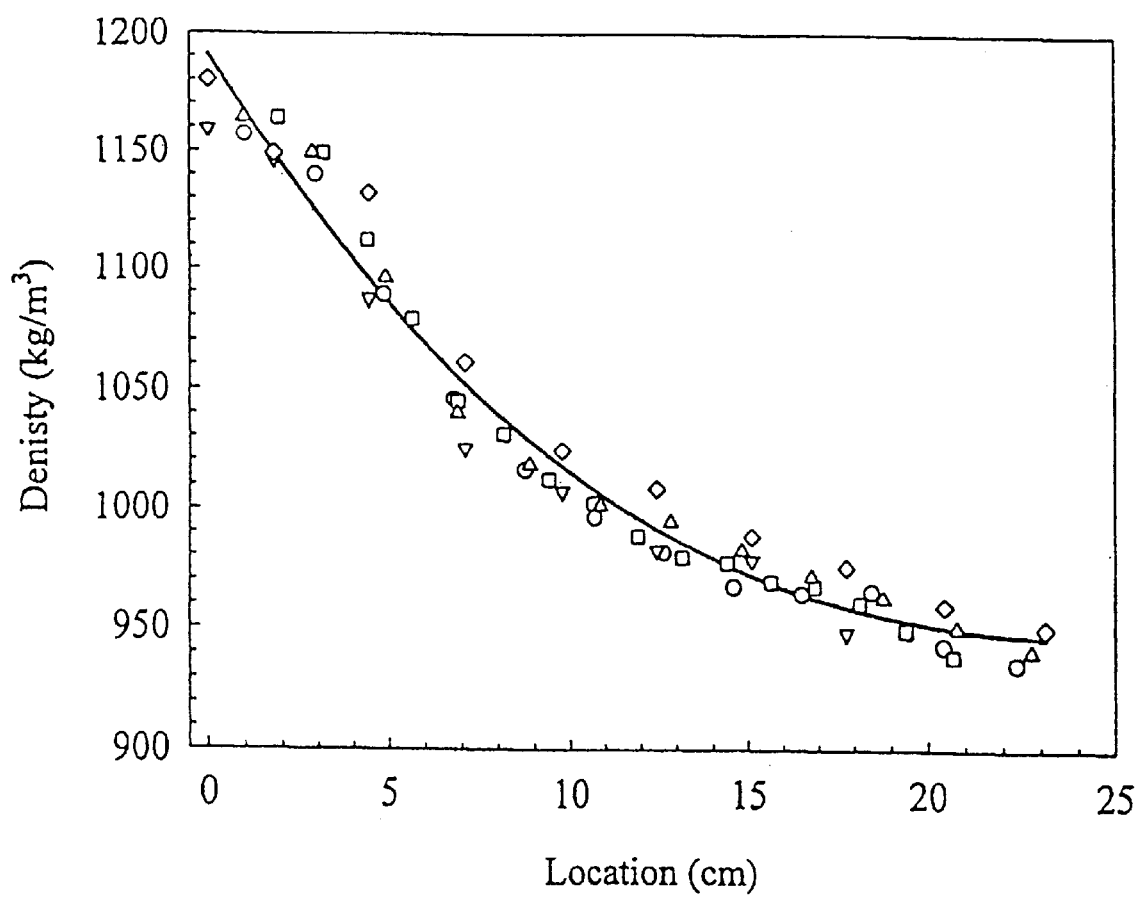
FIG. 4b is a graph of a density profile for an FGM with a polyester-plasticizer matrix.
Figure 5A:
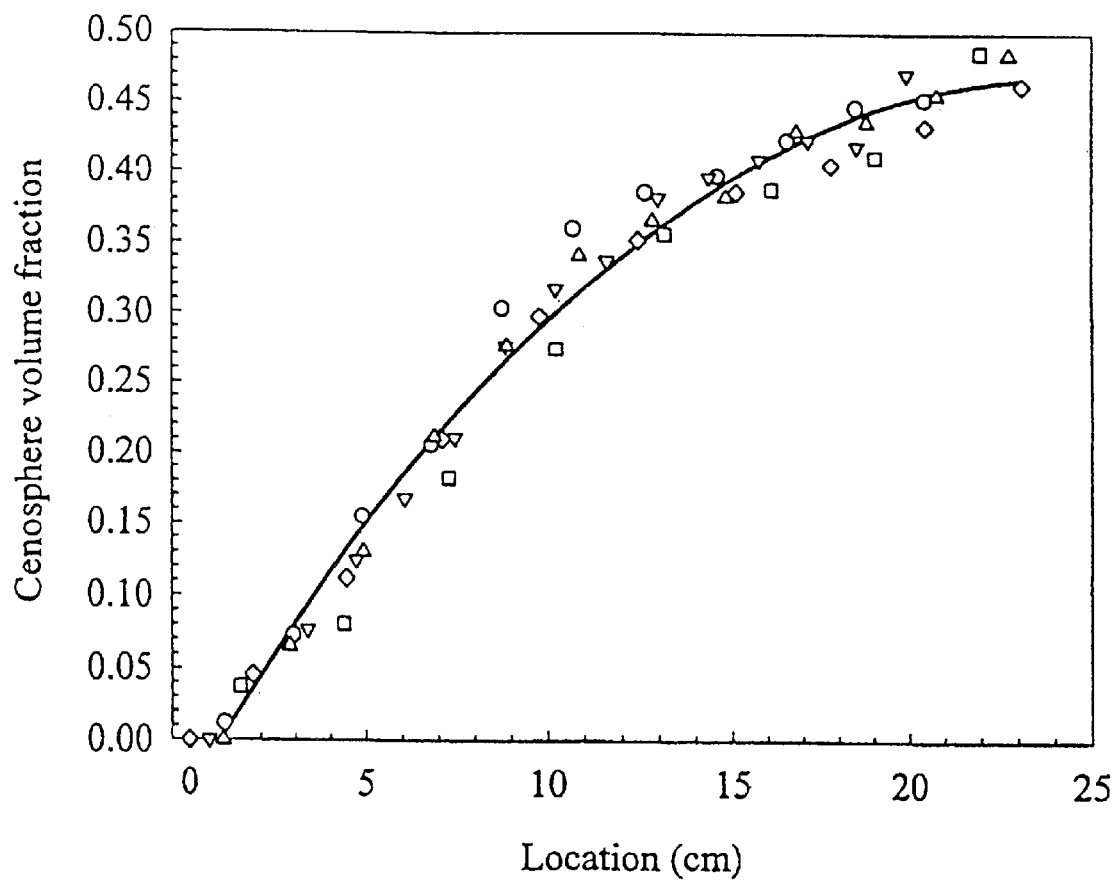
FIG. 5a is a graph of a spatial variation of a cenosphere volume fraction profile for an FGM with a polyester matrix.
Figure 5B:
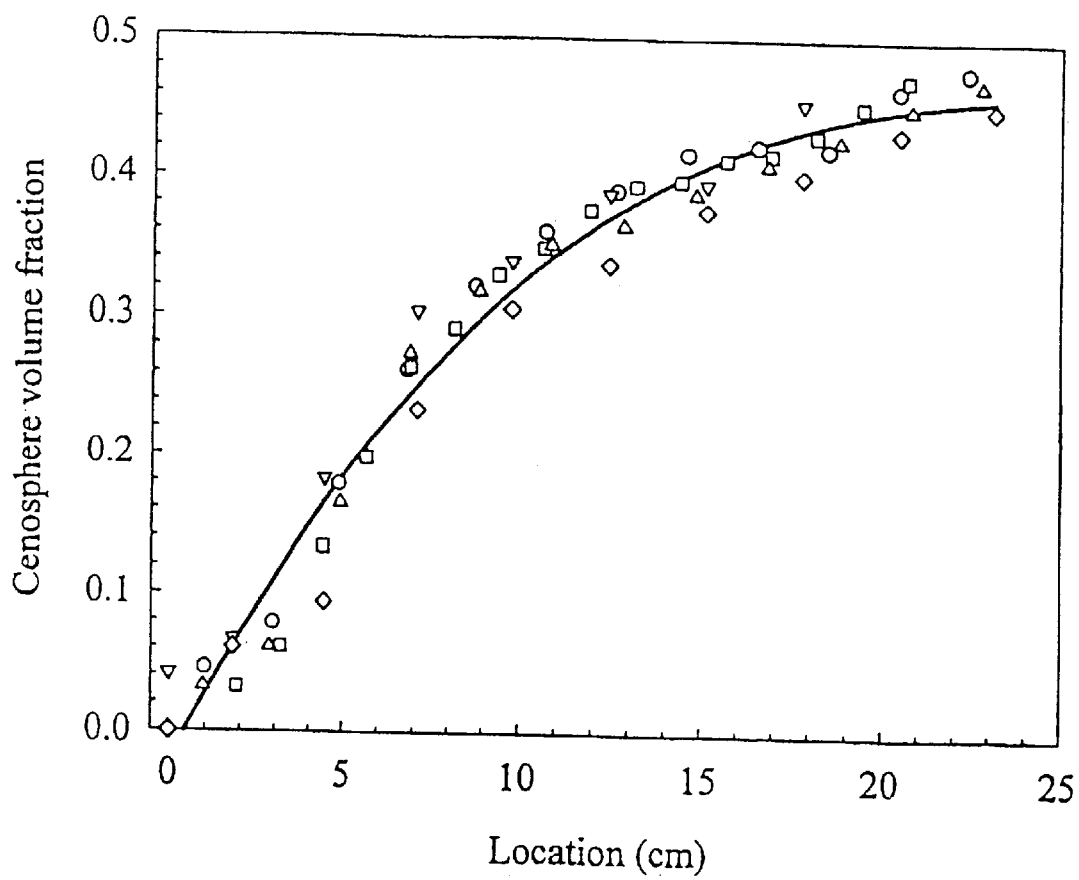
FIG. 5b is a graph of a spatial variation of a cenosphere volume fraction profile for an FGM with a polyester-plasticizer matrix.

The density of the FGM sheet at different locations was measured as explained in section 3.1 and the density profile obtained is shown in FIG. 4 for both the FGMs. It can be observed from the figure that the density of the FGM decreases by 20% from that for the virgin resin over a distance of 250 mm for both type of matrices. The decrease is predominant over the initial 100 mm and then the curves flatten out. The composition profile shown in FIG. 5 indicate that the cenosphere volume fraction increases from 0 to 0.45 over 250 mm and the variation is continuous and fairly linear over the initial 100 mm. The data points in FIGS. 4 and 5 include the measured density and the estimated volume fraction of about 50 specimens, used for the various tests mentioned in section 3, obtained from different castings. These data points show very little scatter indicating the repeatability of the process in making FGMs having consistent composition profiles.

Quasi-static Elastic Properties

Figure 6:
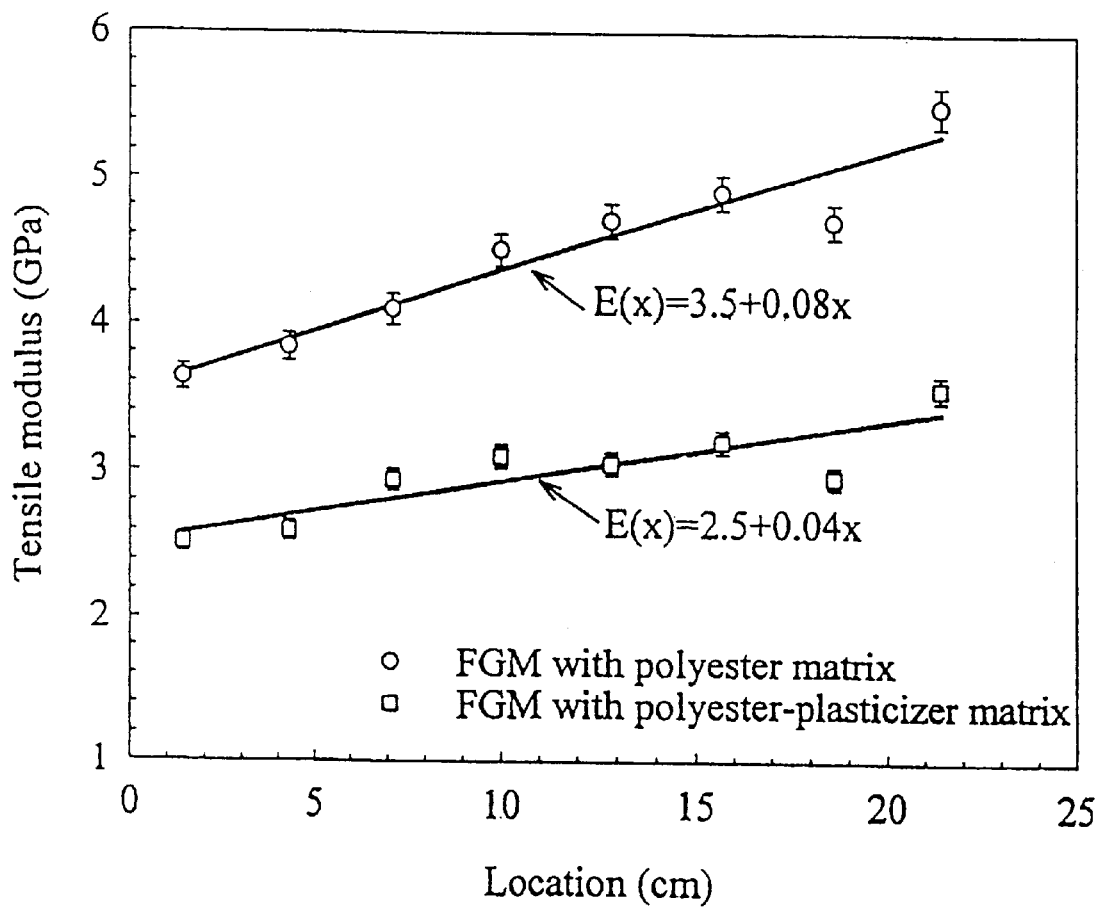
FIG. 6 is a graph of an elastic modulus profile of FGMs.

The spatial variation of the Young's modulus for both the FGMs is shown in FIG. 6. It can be noticed from FIG. 6 that the elastic modulus increases by 55% over a distance of 250 mm in the direction of increasing cenosphere content for the FGM having polyester matrix. The corresponding variation for the FGM having polyester-plasticizer matrix is only 40%. These results indicate that both FGMs have a linear modulus profile. The Young's modulus values for the FGM having polyester matrix is higher than that for the FGM having polyester-plasticizer matrix. This trend of the plasticizer reducing the material stiffness is consistent with earlier studies.

The Poisson's ratio was measured for two samples from the extreme ends of the sheet. The values of Poisson's ratio for the polyester matrix FGM were 0.33 for no cenosphere content and 0.34 for a cenosphere volume fraction of 0.45. The corresponding values for the polyester-plasticizer matrix FGM were 0.41 and 0.38. The cenospheres are essentially hollow ceramic particles which are significantly harder than the matrix. Inclusion of these particles restricts the free deformation of the matrix around it and hence increases the overall material stiffness.

Figure 7:
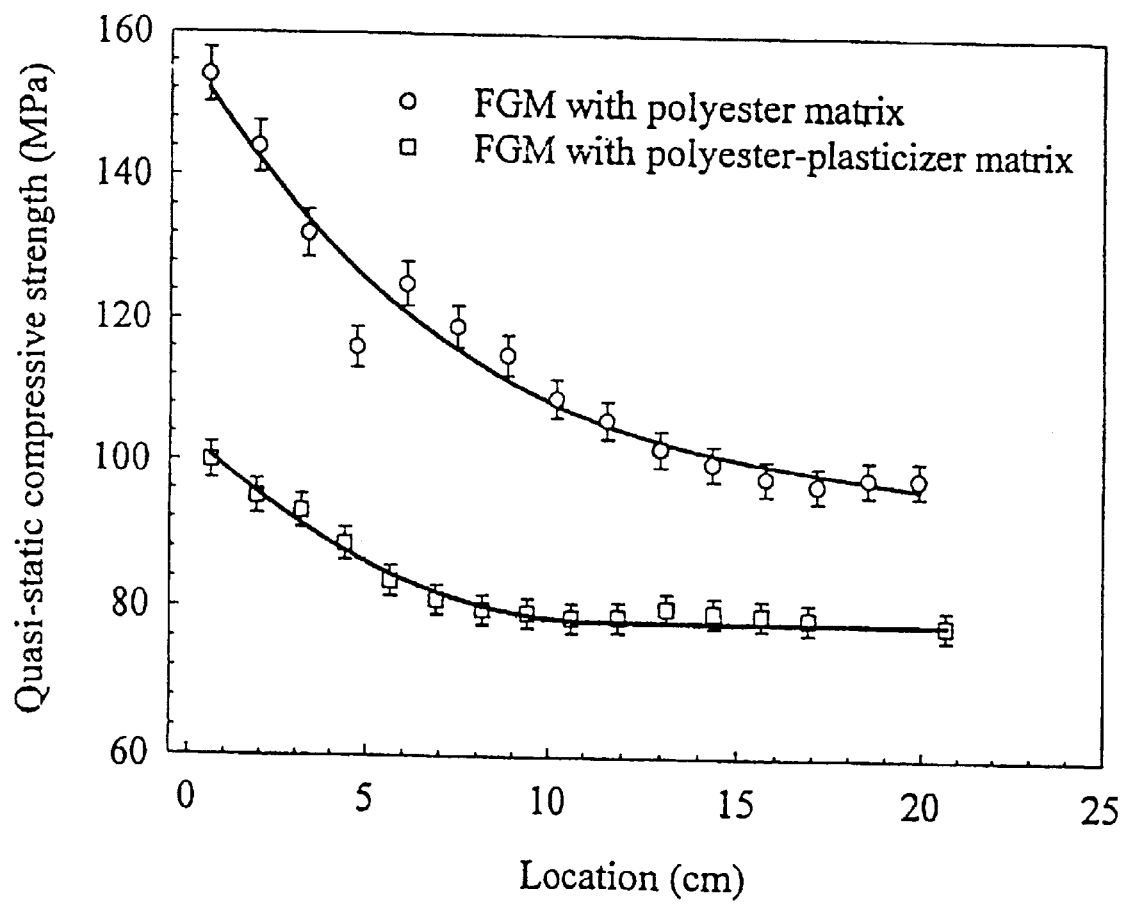
FIG. 7 is a graph of a quasi-static compressive strength profile for FGMs.

The quasi-static compressive strength of the FGMs registered a decrease in the direction of increasing cenosphere content. The spatial variation of quasi-static compressive strength, shown in FIG. 7, indicates that most of the strength reduction occurs over the initial 100 mm for both FGMs. In the case of the polyester matrix FGM, the test specimens failed by axial splitting in a brittle manner for lower cenosphere volume fraction. As the cenosphere volume fraction was increased, the failure pattern shifted to sudden fracture along planes at 45 degree angle to the load which indicates shear failure. The reduction in strength over a distance of 200 mm was 37%. On the contrary, for the FGMs having polyester-plasticizer matrix, the strength reduction over 200 mm was only 22%. The material behavior was elastic-plastic. At lower cenosphere volume fraction, after reaching the maximum load the specimens started to yield with a drop in the load. This was followed by buckling with plastic deformation. With increasing cenosphere content, the failure pattern changed to extensive sliding with plastic deformation on a single plane at 45 degrees to the load.

Fracture Properties

Figure 8:
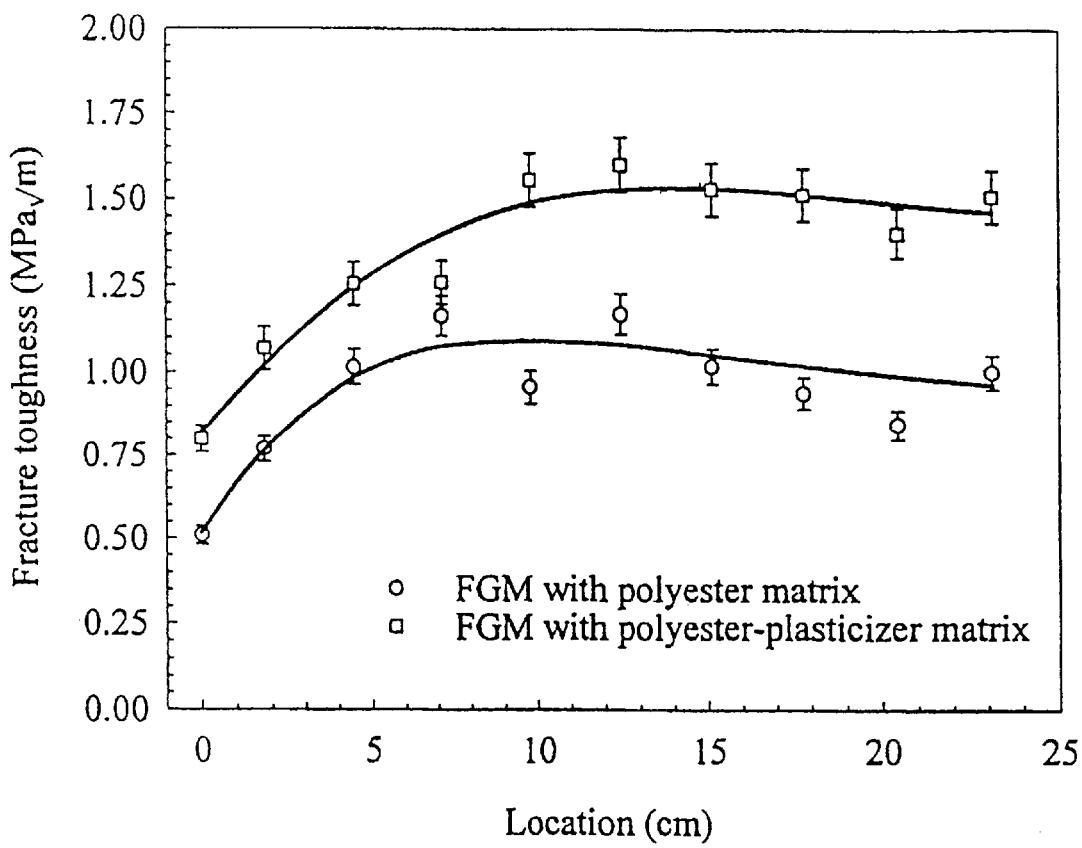
FIG. 8 is a graph of a fracture toughness profile for FGMs.

The variation of fracture toughness as a function of location was determined for both the FGMs using the three point bending test. The toughness profile for FGMs having polyester and polyester-plasticizer matrix is shown in FIG. 8. The fracture toughness increases by 100% over the first 100 mm for both matrices. The fracture toughness of the polyester-plasticizer matrix FGM is higher than that for the polyester matrix FGM. This result is consistent with earlier studies. Also the fracture toughness of virgin polyester and polyester-plasticizer matrix in this study were the same as obtained in earlier studies. After the initial 100 mm the fracture toughness remains fairly constant for FGM having polyester-polyester matrix but registered a slight decrease for the FGM having polyester matrix. A similar trend for the fracture toughness of epoxy resin with increasing fly ash content has also been reported. Srivastava, K. and Shembekar, P. S., (199), "Tensile and Fracture Properties of Epoxy Resin Filled with Flyash Particles", Journal of Material Science, 25, 3513–1316.

Figure 9:
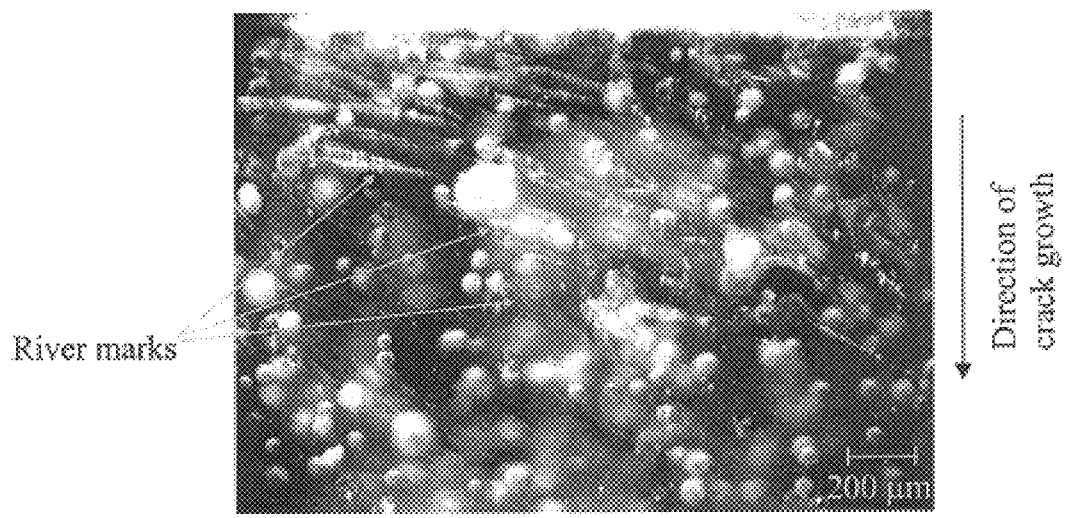
FIG. 9 is an optical micrograph of a fracture surface features at low cenosphere volume fraction.
Figure 9:
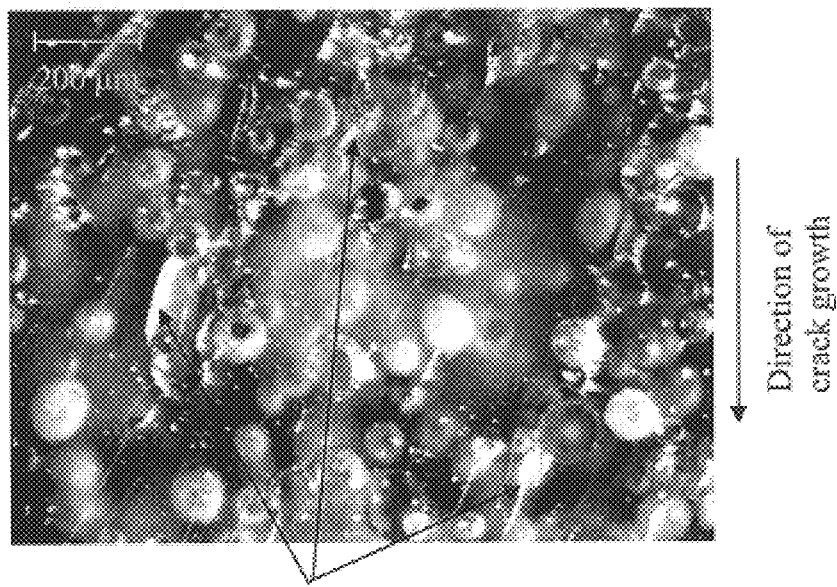

The presence of cenospheres which are distributed had inclusions in the resin alters the fracture process resulting in a change in the fracture toughness. In a particulate composite, there are additional fracture mechanisms which can enhance the fracture energy. To identify these, fractographic analysis of the tested specimens were performed using a Nikon SMZ-U optical microscope. For specimens having low cenosphere volume fraction, the initiation site featured numerous river marks and interface failure as shown in FIG. 9(a). These river marks are typical of polyester failure. Very few broken spheres could be identified. Spheres attached to one of the fracture surfaces with a corresponding recess in the other surface were observed. For a crack to traverse through a brittle particle in its path, either the particle should cleave or the interface between the particle and matrix should delaminate. Since the spheres are intact interface failure is mandatory for the crack to propagate. The interface area is twice the projected area for a hemispherical interface, hence the energy required for interface delamination should be higher than that for matrix fracture, provided the interface toughness is greater than half the matrix toughness. In addition to river marks and interface failure, marks originating from the spheres and extending for a certain distance down-stream of the crack growth, were observed especially around small sized spheres. Such marks are evidence of non-planar crack front. These marks shown, in FIG. 9(b), appeared specular and hence are steps orthogonal to the main crack surface. Such steps are formed when the main crack front splits onto different planes as it traverses the particles and then rejoins to form a planar crack front. The interface delamination and the non planar crack front result in increased fracture surface area and an associated increase in the fracture energy.

Figure 10:
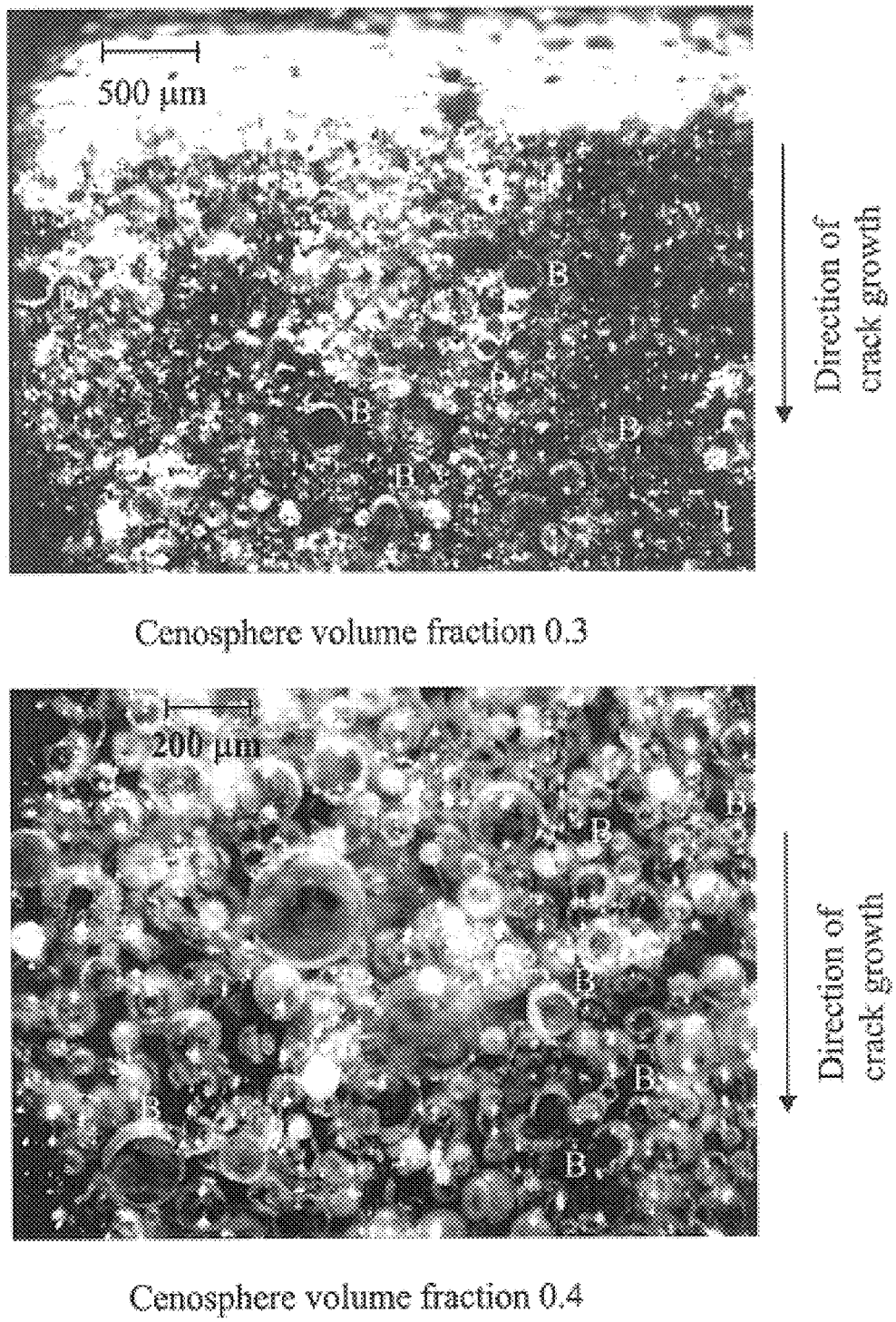
FIG. 10 is a micrograph of aracture surface showing broken spheres (B)

The crack initiation sites of the specimens having higher cenosphere volume fraction, shown in FIG. 10, revealed lot of broken spheres in addition to a few river marks in the matrix. Since the cenospheres are hollow and have very small wall thickness (3–30 $\mu$m), breaking of the spheres during the process of forming the initial crack is unavoidable and could cause blunting of the crack tip. The effect of this crack blunting is to increase the value of the measured toughness. Inspection of the fracture surface away from the initiation site also revealed numerous broken spheres in these specimens. Few interface failures and evidence of non-planar crack front were seen in the location of small spheres in this region. This indicates that the predominant mechanism of fracture at high cenosphere volume fraction is matrix cracking associated with breaking of spheres. Therefore, breaking of the spheres and the associated local crack blunting is inherent in the fracture mechanism. In this context, concerns regarding the effect of a blunt initial crack (due to broken spheres) on the measured values of fracture toughness is of lesser significance. With an increase in the cenosphere volume fraction, the effective matrix area decreases and the portion of the load carried by the matrix also decreases. This will lead to load sharing by the spheres causing their breaking during the failure process. The ceramic spheres are stronger than the matrix and therefore even with this fracture mechanism the toughness of the composite must be greater than the toughness of the matrix which is evident from FIG. 8.

Dynamic Properties

Figure 11:
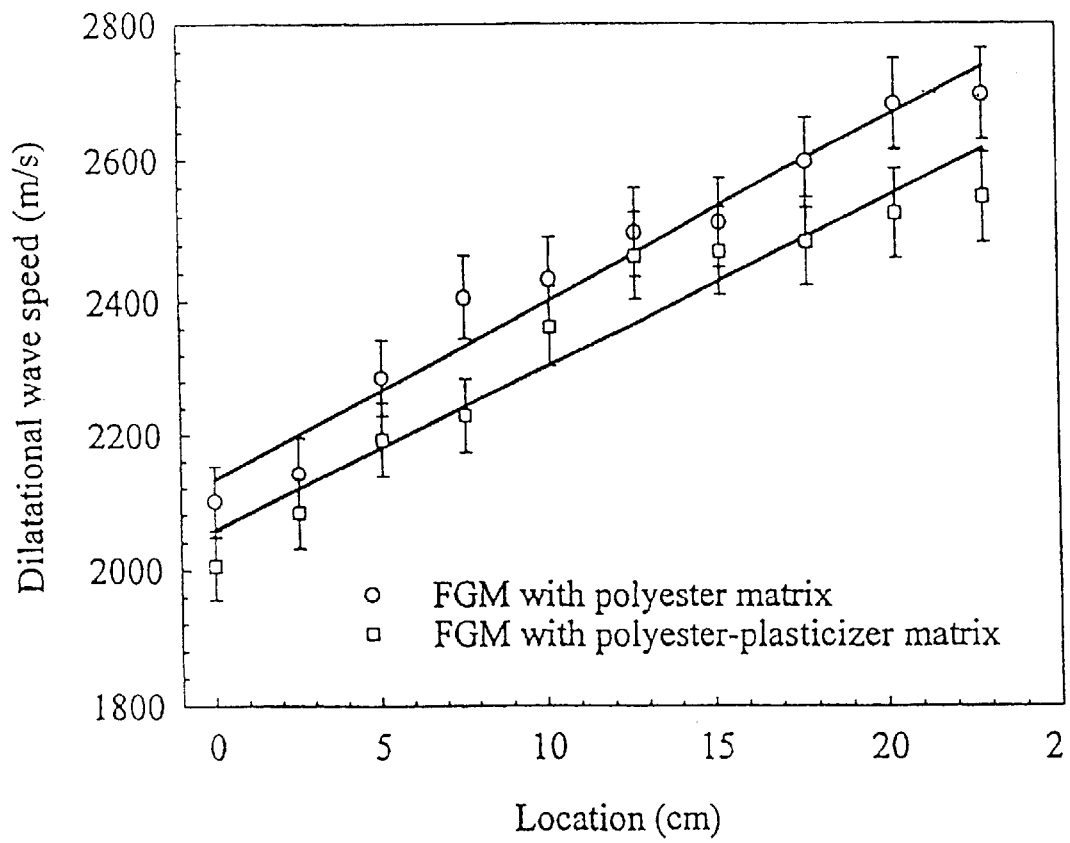
FIG. 11 is a graph of a spatial variation of dilatational wave speed for FGMs.
Figure 12:
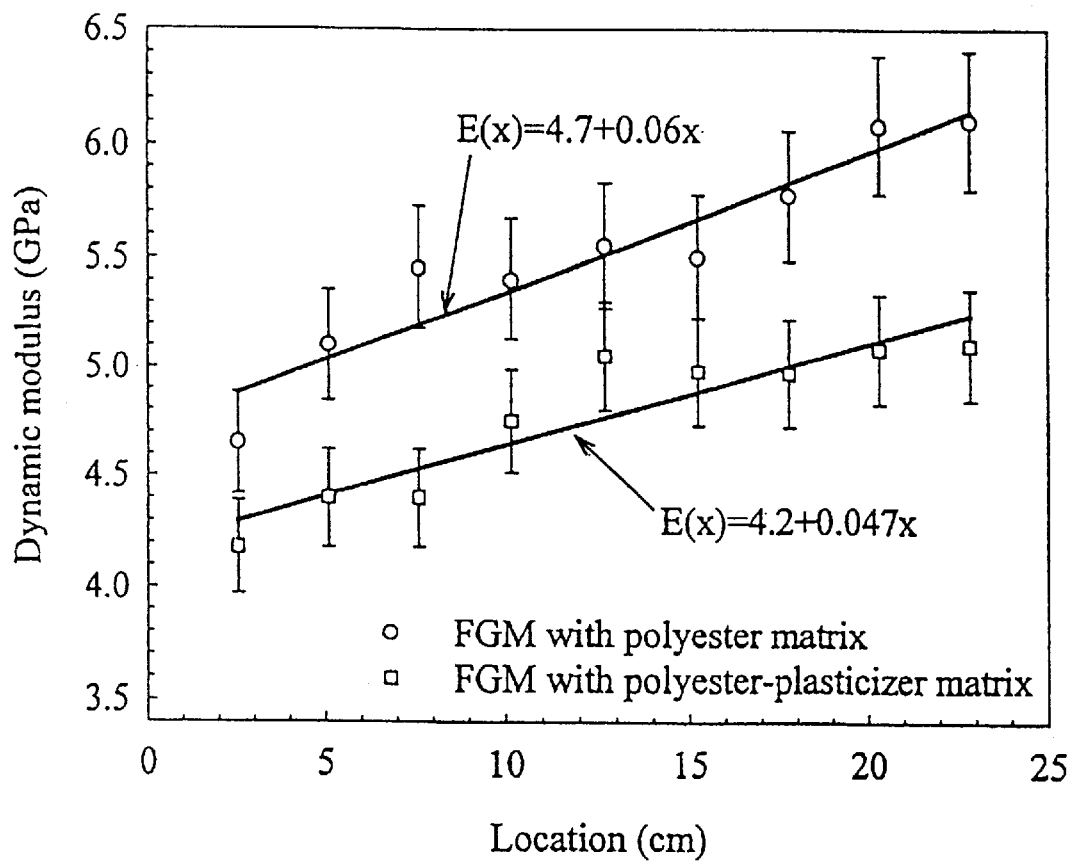
FIG. 12 is a graph of a dynamic modulus profile of FGMs.

The dilatational wave speed of the FGM as a function of location was determined using the procedure above. The dilatational wave speed increased along the direction of increasing cenosphere volume fraction. This increase was a result of increasing modulus and decreasing density of the material. The spatial variation of dilatational wave speed for both FGMs is given in FIG. 11. In order to determine the dynamic modulus profile, the Poisson's ratio of the material under dynamic loading is required. Previous studies with polyester-plasticizer sheets indicated that the dynamic properties are insensitive to the plasticizer content. The Poisson's ratio under dynamic loading for polyester-plasticizer sheets has been reported as 0.37. This value of Poisson's ratio and the density profile of. the FGMs were used to generate the dynamic modulus profile of the FGM using equation (2). The dynamic modulus as a function of location, shown in FIG. 12, increases along the direction of increasing cenosphere volume fraction for both FGMs.

Figure 13:
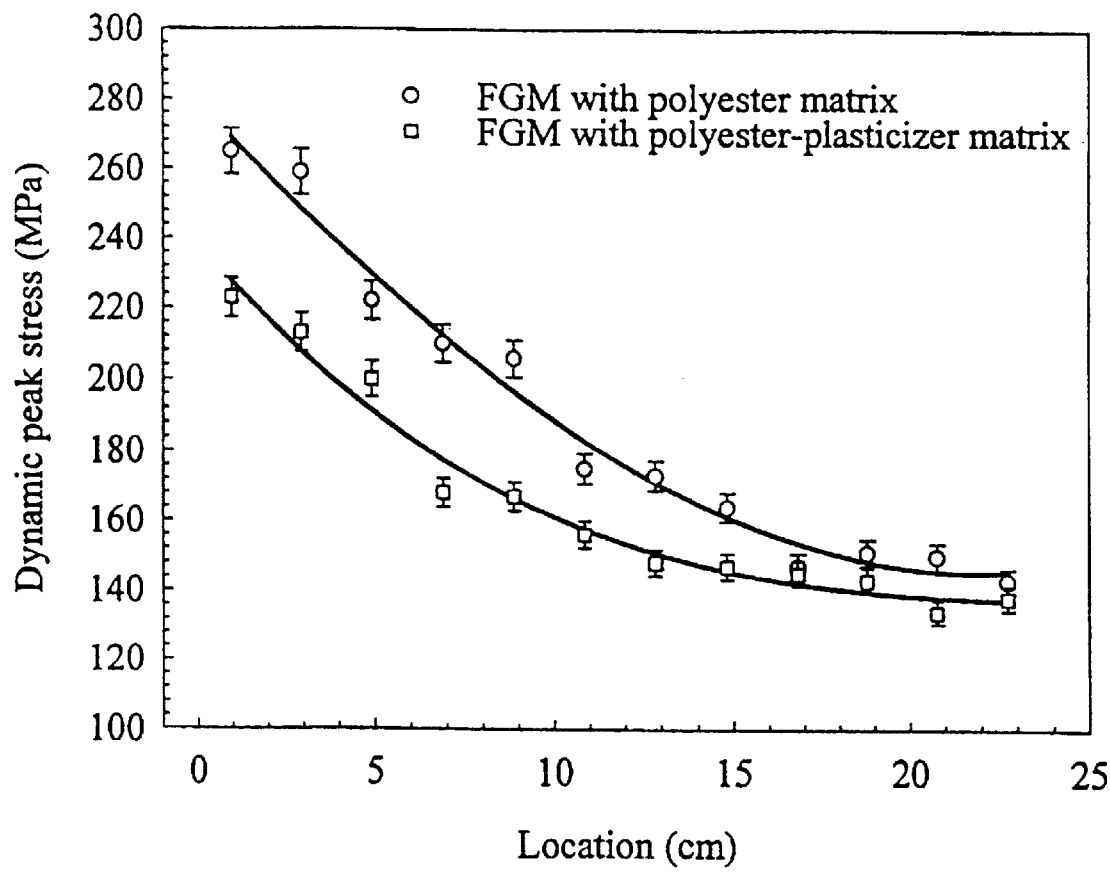
FIG. 13 is a graph of a variation of the dynamic peak stress as a function of location for FGMs at strain rates in the range of 3000–5000/sec.
Figure 14:
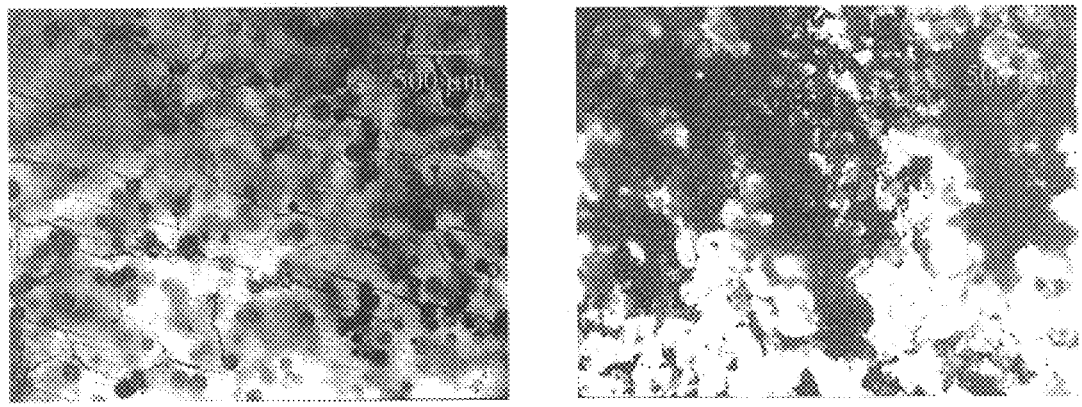
FIG. 14 is a micrograph of damage developed under dynamic loading (a) cellular pattern of cracks (b) crushed matrix and cenospheres.

The dynamic stress strain response of the FGMs at different locations was obtained using the SHPB technique for both the matrices. The peak stress registered by the specimen decreased in the direction of increasing cenosphere content as shown in FIG. 13. As the cenosphere volume fraction increases from 0 to 0.45, the dynamic peak stress decreases by 45% for the FGM with polyester matrix where as it decreases by 37% for the FGM with polyester-plasticizer matrix. For the same cenosphere volume fraction the FGM with polyester matrix registered higher values of the dynamic peak stress than the FGM with polyester-plasticizer matrix. The tested specimens were examined under a microscope to understand the type and extent of damage during stress wave loading. For very low cenosphere volume fractions (0.02–0.1), the specimen was intact after testing although several cracks initiating from the cenospheres were observed. These cracks had a cellular pattern with the cenospheres at the cell vertices as shown in FIG. 14(a). Of the two the FGMs, the one with polyester-plasticizer matrix had fewer number of cracks. With an increase in cenosphere volume fraction, the specimens broke into several pieces. The surfaces of these pieces revealed delamination at the cenosphere-matrix interface and also a few broken cenospheres. The mode of failure was primarily interface delamination and matrix cracking. The size of the broken pieces was larger for the FGM having polyester-plasticizer matrix. At very high cenosphere volume fraction (0.3 –0.45), the specimen crumbled into very small pieces along with crushed fine particles as shown in FIG. 14(b). The surfaces of the pieces revealed lot of broken cenospheres and the fine particles consisted of crushed matrix and cenosphere. The mode of failure was predominantly cenosphere breaking and crushing along with matrix fracturing.

Empirical Modeling

The properties of the polyester and polyester-plasticizer resins change with cenosphere volume fraction. Several empirical models are available to estimate the overall properties of composites from a knowledge of the material composition and constituent properties. The Halpin-Tsai equation for composites with discontinuous reinforcements is used to estimate the overall modulus of the FGMs. The composite modulus is given by the relation $$E_c = \frac{E_m(1 + 2sqV_{eff})}{1 - qV_{eff}} \quad (5)$$

in which s is the particle aspect ratio (1 for spherical particles), $V_{eff}$ is the effective volume fraction of cenospheres and $E_c$, $E_s$ and $E_m$ are the elastic modulus of the composite, cenospheres and the matrix respectively. The parameter q is defined as $$q = \frac{\frac{E_s}{E_m} - 1}{\frac{E_s}{E_m} + 2s} \quad (6)$$

When $E_s$ is large compared to $E_m$ as in the case of cenospheres the value of q can be approximated as 1. The effective volume fraction of the cenospheres is the volume of the material after removing the hollow interior. This can be calculated from the knowledge of the thickness to radius ratio of the cenospheres. However, since the spheres are not of uniform diameter and wall thickness, the average thickness to radius ratio is estimated from the apparent density of the cenospheres. The ratio of the material volume to the sphere volume $r_v$ can be obtained as $$r_v = \frac{V_{eff}}{V_s} = 3\frac{t}{r} \quad (7)$$

The apparent density of the spheres is obtained from the relation $$\rho_s = \frac{V_{eff}\rho_a}{V_s} = 3\rho_a \frac{t}{r} \quad (8)$$

in which $\rho_a$ is the density of aluminum silicate (2.4 g/cc), t is the wall thickness and r is the sphere radius. The apparent density of the cenospheres was measured to be 0.67 g/cc, and using equation 8, $r_v$ was obtained as 0.25. Equation 5 can be written in terms of $V_s$ in the following form.

$$E_c = \frac{E_m(1 + 2r_vV_s)}{1 - r_vV_s} \quad (9)$$

Figure 15:
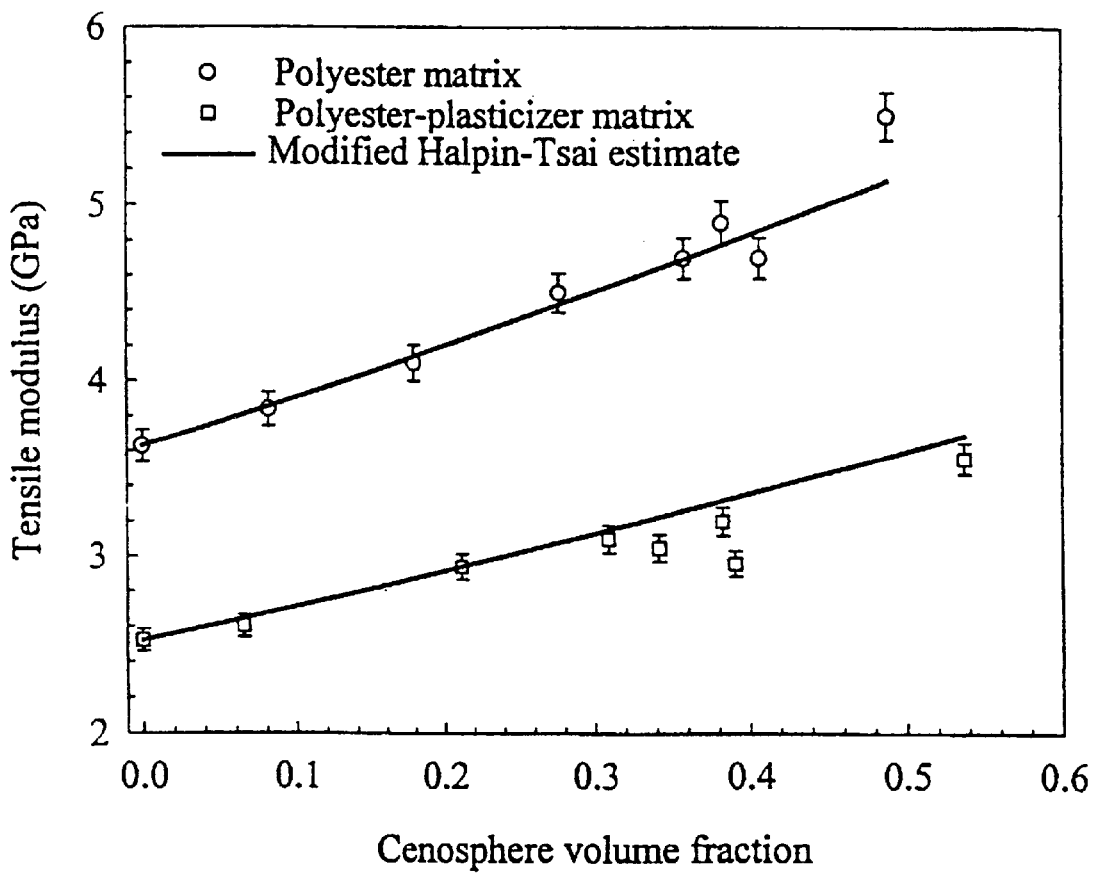
FIG. 15 is a graph of tensile modulus of FGMs as a function of the cenosphere content.

FIG. 15 compares the measured values of elastic modulus for both the FGMs as a function of cenosphere volume fraction to the estimates from equation 9. It can be seen that estimates using the Halpin-Tsai equation with the porosity correction match closely with measured values.

Figure 16:
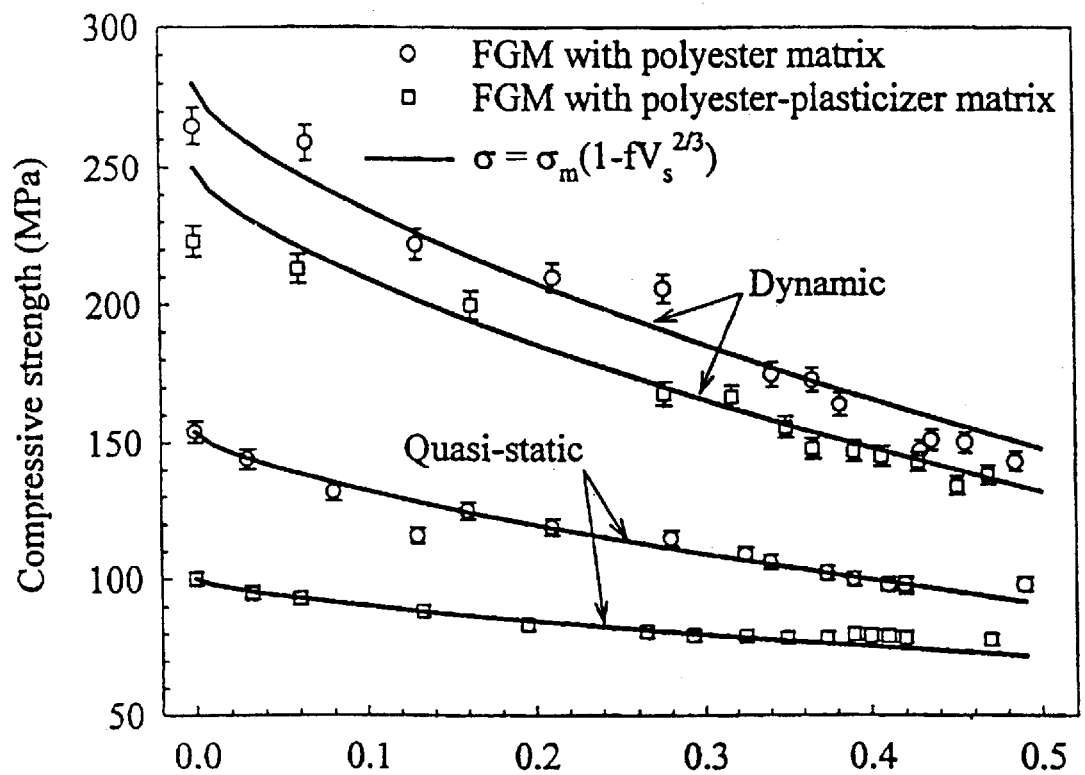
FIG. 16 is a graph of compressive strength as a function of cenosphere content.

Inclusion of the hollow cenospheres reduces the effective load bearing area of the matrix, and hence the strength of these composites will be lower than that of the matrix. For a given volume fraction, the effective strength of the composite can be written as $$\sigma_c = \sigma_m(1 - fV_s^{2/3}) \quad (10)$$

where $\sigma_m$ is the matrix strength and f is an experimentally determined factor. FIG. 16 shows the variation of the compressive strength of the material as a function of cenosphere content along with the estimates using equation 10. For the dynamic strength, the values of $\sigma_m$ and f were 280, 0.75 and 250, 0.75 for the polyester and polyester-plasticizer matrices respectively. The corresponding values for the quasi-static strength, were 154, 0.65 and 100, 0.45 for the polyester and polyester-plasticizer matrices respectively. The factor f is equal to 1.21 if the interfaces are weak and the matrix is assumed to carry the entire load. A value off less than 1.21 as obtained here indicates load sharing by the particles. When the FGMs are loaded in compression the area occupied by the particles can share load unlike the case of tensile loading.

The ratio of dynamic strength to quasi-static strength indicates the rate sensitivity of the material. It can be observed from FIG. 16 that the FGM with polyester-plasticizer matrix is more rate sensitive than the FGM with polyester matrix. The average ratio of dynamic to quasi-static strength is 1.75 for the FGM having polyester matrix where as the corresponding value for the FGM having polyester-plasticizer matrix is 2.25.

The foregoing description has been limited to a specific embodiment of the invention. It will be apparent, however, that variations and modifications can be made to the invention, with the attainment of with some or all of the advantages of the invention. Therefore, it is the object of the appended claims to cover all such variations and modifications as come within the true spirit and scope of the invention.

Having described our invention, what we now claim is:

1. A particulate composite comprising:

a polyester resin;

a plasticizer, the polyester resin and the plasticizer forming a matrix; and a plurality of cenospheres, the cenospsheres distributed nonhomogeneously in the matrix.

2. The particulate composite according to claim 1 wherein the nonhomogenous distribution of cenospheres comprises a continuously varying particle volume fraction along a single dimension.

3. The particulate composite according to claim 1 wherein the plasticizer is polyester.

4. The particulate composite according to claim 1 wherein the composite has a density, the density of the composite decreasing by about 20% with increasing cenosphere volume fraction.

5. A method for the production of a lightweight particulate composition comprising:

mixing a polyester resin with a polyester plasticizer to form a liquid matrix;

adding a plurality of cenospheres to the matrix;

pouring the matrix into a mold; and controlling the distribution of the cenosphere whereby when the matrix solidifies the cenospheres are distributed nonhomogeneously in the matrix.

* * * * *